March 20, 1956  G. E. MARSH  2,739,250
ELECTROMECHANICAL OSCILLATOR

Filed July 19, 1954  3 Sheets-Sheet 1

INVENTOR.
G. E. MARSH
BY
Forest B. Hitchcock
HIS ATTORNEY

March 20, 1956   G. E. MARSH   2,739,250
ELECTROMECHANICAL OSCILLATOR
Filed July 19, 1954   3 Sheets-Sheet 2

INVENTOR.
G. E. MARSH
BY
Forest B. Hitchcock
HIS ATTORNEY

March 20, 1956 G. E. MARSH 2,739,250
ELECTROMECHANICAL OSCILLATOR
Filed July 19, 1954 3 Sheets-Sheet 3

INVENTOR.
G. E. MARSH
BY
Forest B. Hitchcock
HIS ATTORNEY

United States Patent Office 2,739,250
Patented Mar. 20, 1956

2,739,250
ELECTROMECHANICAL OSCILLATOR

Gareld E. Marsh, Rochester, N. Y., assignor to General Railway Signal Company, Rochester, N. Y.

Application July 19, 1954, Serial No. 444,300

14 Claims. (Cl. 310—33)

This invention relates to electromechanical oscillators and relates, more particularly, to electromechanical oscillators which employ pendulums as a mode of operation.

In a pendulum-type oscillator pulses of output energy can be controlled by pendulum movement in a manner such that the frequency of pulsation is in direct relation to the natural frequency of oscillation of the pendulum. Furthermore, the input energy to an oscillator (i. e. the driving force for the pendulum) can be controlled such that the driving force acting on the pendulum is received in pulses, the frequency of pulsation being in direct relation to the frequency of oscillation of the pendulum. Thus, a pendulum can control its driving force to a degree whereby frictional and other restraining forces are counterbalanced and the motion of the pendulum is, in effect, undamped.

A problem in the construction of a pendulum-type oscillator concerns the pivot or bearing structure for supporting the pendulum. It is desirable to provide a bearing structure having low frictional characteristics and minimized tendencies to wear. Since a pendulum performs oscillatory motion of a limited amplitude, frictional wearing of bearing surfaces is confined to relatively small areas, resulting in shortened bearing life.

A further consideration concerns the means by which useful work can be obtained from a pendulum for performing operations such as the actuation of electrical contacts.

In view of the above, it is intended in this invention to provide a pendulum-type oscillator capable of controlling its input and output energies in accordance with the natural frequency of oscillation of the pendulum. It is also intended, in this invention, to provide a pendulum-supporting structure having a relatively large bearing surface and correspondingly low frictional characteristics. It is further intended to provide a simple means for obtaining useful work from a pendulum, directly from the pendulum structure.

An object of this invention is to provide a simplified pendulum-type electromechanical oscillator capable of delivering pulses of output energy at a constant frequency of pulsation.

Another object of this invention is to provide a roller bearing structure for the support of a pendulum.

Another object of this invention is to provide a pendulum structure which can be adjusted to alter the period of a pendulum.

Another object of this invention is to provide a simple means for actuating electrical contact fingers by a contact actuator incorporated into the pendulum structure.

A further object of this invention is to provide a pendulum structure which can be adjusted to alter the length of stroke of a contact actuator incorporated into the structure.

Another object of this invention is to provide a pendulum supporting structure tending to maintain a balanced mechanical restoring force on a pendulum.

Other objects, purposes and characteristic features of the present invention will be in part obvious from the accompanying drawings, and in part pointed out as the description of the invention progresses.

General structural arrangement

Figure 1:
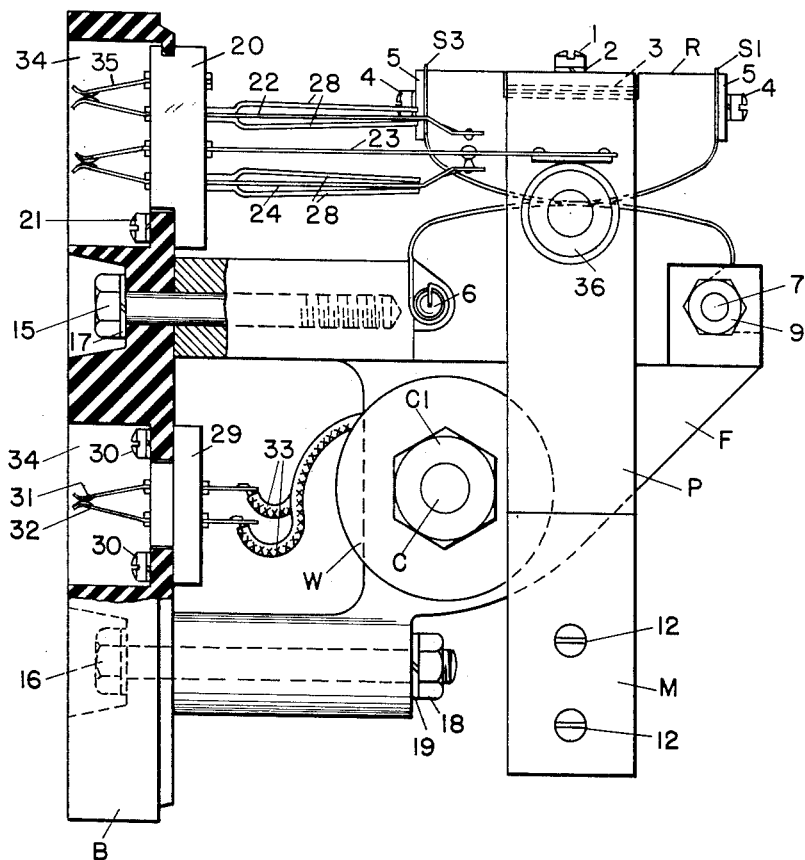
Fig. 1 shows a side elevation, partly in cross section, of the oscillator embodied in this invention.
Figure 2:
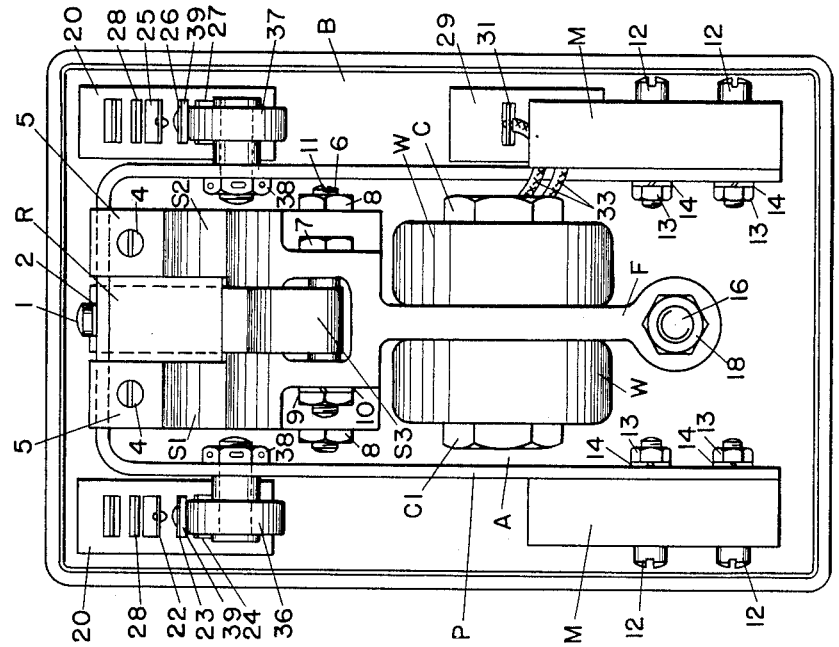
Fig. 2 shows a front elevation of the oscillator embodied in this invention.
Figure 3:
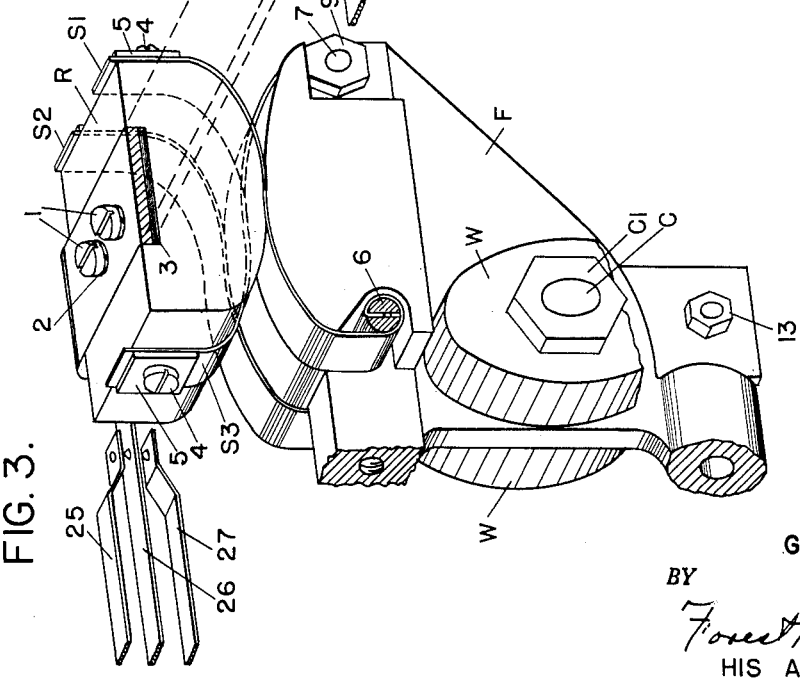
Fig. 3 shows, in perspective, the essential operating elements of the oscillator embodied in this invention.

Referring now to Figs. 1–3, the reference character P designates a U-shaped pendulum structure made of a magnetic material.

The pendulum P is seated in a slot in the top surface of a rocker R and is attached to the rocker R by two screws 1 which pass through the openings in the pendulum P and are engaged by threaded openings in the rocker R. Lock washers 2 prevent loosening of the screws 1 by vibration. Shims 3 can be inserted between the pendulum P and the rocker R for reasons to be described.

A frame F, made of a non-magnetic material, supports the rocker R along a cylindrically convex upper surface of the frame F.

Three thin leaf springs S1, S2 and S3 are attached to the rocker R by screws 4 which pass through openings in plate washers 5 and the springs S1, S2 and S3, the screws 4 being engaged by threaded openings in the rocker R. The springs S1 and S2 are attached to the front of the rocker R, an edge of each spring being aligned with a vertical lateral edge of the rocker R. The spring S3 being attached to the back of the rocker R and aligned along the center line of the rocker R, between the springs S1 and S2. The springs S1 and S2 pass downward along the surface of the rocker R, pass under the rocker, follow the rear half of the curved upper surface of the frame F, pass downward behind the frame F, and are engaged by a slotted stud 6. Similiarly, the spring S3 passes downward along the surface of the rocker R, passes under the rocker, passes downward along the front half of the curved upper surface of the frame F and is engaged by a slotted bolt 7.

The slotted stud 6 passes through openings in the frame F and is retained at each extremity by a nut 8. The slotted bolt 7 also passes through openings in the frame F and is retained by a nut 9 and a lock washer 10. Tension in the springs S1 and S2 can be adjusted by turning the slotted stud 6 with a suitable tool which can be engaged by a slot 11 in one end of the stud. Similarly, tension in the spring S3 can be adjusted by turning the slotted bolt 7 with a wrench or other suitable tool.

Thus, the rocker R is seated on the springs S1, S2 and S3; and the rocker and the springs are supported by the frame F. The rocker R is seated on the apex of the curved upper surface of the frame F and aligned so that the longitudinal center lines of the rocker and the frame lie in the same vertical plane; the springs S1, S2 and S3 being adjusted to fix this position of the rocker R and to allow only rolling movements by the rocker R.

The forces applied to the rocker R by the springs S1 and S2 and the spring S3 are assumed to be equal; and the weight of the pendulum P is great enough to cause the pendulum to normally assume a vertical position. The pendulum P, when displaced from its normally vertical position, is acted upon by a restoring force equal to the force of gravity plus the spring forces of springs S1, S2 and S3.

Two equal weights M are attached to the pendulum P by screws 12 which pass through openings in the weights M and the pendulum P and are retained by nuts 13 and lock washers 14. Since the weights M are removable, a means for controlling the period of oscillation of the pendulum P is established in that the radius of gyration of the pendulum P can be increased or decreased by attaching heavier or lighter weights, respectively; and the period of the pendulum is lengthened or shortened accordingly.

A core C, made of a magnetic material, passes through openings in windings W and the frame F. The core C is threaded at one end and is retained by a nut C1. The windings W are supported by the core C and are held against the frame F by the head of the core C and by the nut C1; and thus the core C, the nut C1 and the windings W form an electromagnet.

The frame F is attached to a base B by bolts 15 and 16. The bolt 15 passes through an opening in the base B and threads into an opening in the frame F. A lock washer 17 prevents vibrational loosening of the bolt 15. The bolt 16 passes through openings in the base B and the frame F and is retained by a nut 18 and a lock washer 19.

Attached to the base B are two molded contact blocks 20, made of an insulating material, which are slotted along the top surface to engage the base B and which are held by screws 21, the screws 21 passing through openings in the base B and threading into the contact block 20.

The contact blocks 20 are molded around contact springs 22—27. Although any contact configuration and capacity can be obtained in practice, only the basic arrangement required for a subsequent description of oscillator operation is shown (i. e. two dependent front-back contact arrangements). Stop springs 28 position and limit movements of the contacts 22, 24, 25, and 27.

A third contact block 29, made of an insulating material, is attached to the base B by screws 30. The contact block 29 is molded around contact springs 31 and 32 which are solder-connected to wire leads 33 of the windings W.

External connections to the various contact springs are assumed to be made when the base B is mated with a plugboard in the manner described in J. F. Merkel, U. S. Patent No. 2,258,122, dated October 7, 1941; contact fingers on such a plugboard extending into openings 34 in the base B to be engaged by the various contact springs. Retaining springs 35 are provided to act in conjunction with the projections of the contact springs 22 and 25 in engaging contact fingers extending from a plugboard.

Two contact actuators in the form of roller bearing structures 36 and 37 are attached to the pendulum P, each of the roller bearings 36 and 37 passing through openings in the pendulum and being retained by nuts 38. The roller bearings 36 and 37 are aligned along a common axial center line which is perpendicular to the vertical center line of each leg of the pendulum P. The horizontal axis of the roller bearings can be raised or lowered in relation to the contact springs by inserting or removing quantities of the shims 3.

As the pendulum P oscillates the roller bearings 36 and 37 move along paths to be described, actuating the contact springs 23 and 26 which follow the outer races of the roller bearings 36 and 37, respectively. For purposes of insulation, plates 39, made of an insulating material, are riveted to the contact springs 23 and 26; and the plates 39 make physical contact with the roller bearings 36 and 37.

*Description of operation*

As described above, the pendulum P is attached to the rocker R which, in turn, is attached to the frame F by the springs S1, S2 and S3; and the springs permit the rocker R to move only in rolling along the curved path described by the curved upper surface of the frame F. The rocker R actually rests on the springs S1, S2 and S3; but since the springs are very flexible they follow portions of the surfaces of the rocker R and the frame F at all times. The springs S1, S2 and S3 effectively become extensions of the surface of the frame F. Thus, the structural combination of the rocker R, the springs S1, S2 and S3 and the frame F produces a roller bearing assembly having the low frictional resistance to motion inherent in roller bearing structures. Furthermore, the bearing surface supporting the rocker R is relatively large, reducing wear.

The rocker R is positioned at the apex of the curved upper surface of the frame F in a manner such that the longitudinal centerlines of the rocker R and the frame F lie in the same vertical plane; and a vertical plane through the centerlines of the lateral surfaces of the pendulum P pass through the apices of the curved upper surface of the frame F and the curved rolling surface of the rocker R.

Once positioned, the rocker R is held in position by adjusting the springs S1, S2 and S3. The springs S1 and S2 are adjusted in unison by turning of the slotted stud 6 while the spring S3 is adjusted by turning of the slotted bolt 7. Enough tension must be created in the springs S1, S2 and S3 to remove slack. In other words, the springs must be drawn tight enough to force them to conform with the surfaces of the rocker R and the frame F. The tensions created in the springs S1, S2 and S3 determine the bearing pressure of the rocker R on the springs and the frame F. Tensional adjustments of the springs provide a means for adjusting the position of the rocker R on the frame F.

Since the springs S1 and S2 are positioned so that the outer edge of each coincides with one lateral edge of the rocker R and a corresponding edge of the curved upper surface of the frame F, a means is provided for positioning the rocker R so that its longitudinal centerline lies in a vertical plane with the longitudinal centerline of the frame F.

It can be noted that the positioning of the spring S3 midway between the springs S1 and S2 prevents turning of the rocker R about a vertical axis when the tension in either the spring S3 or the springs S1 and S2 is changed. In other words, the horizontal components of forces applied to the rocker R by the springs S1 and S2 are parallel to and equidistant from the horizontal component of the reactive force applied by the spring S3; and no turning moment is produced when tensions are changed.

Although adjustments of the tensions in the springs S1, S2 and S3 produce corresponding changes in the vertical components of spring forces exerted on the rocker R, it is assumed that the range of tensional forces encountered in practice is not great enough to substantially affect the period of oscillation of the pendulum by increasing bearing friction.

The windings W are connected in series electrically and are aligned to be additive magnetically. When energized, the windings W produce a magnetic field, the flux of which is confined primarily to a magnetic circuit of relatively low reluctance including the core C, the pendulum P and air gaps A between the core and the arms of the pendulum. Initial energization of the windings W causes the pendulum to rotate toward the core C to reduce the reluctance of the magnetic circuit by reducing the air gaps A. The pendulum, then, is displaced by a magnetic force which, when discontinued, allows the pendulum to respond to the forces of gravity and the springs S1, S2 and S3 and to be accelerated toward its normally vertical position. Frictional forces oppose movements by the pendulum at all times and, because of their presence, prevent the pendulum from performing undamped oscillatory motion at an amplitude equal to twice the magnitude of the pendulum displacement caused by the magnetic force. The windings W are periodically energized during each cycle of oscillation by the pendulum to provide a driving force great enough to counterbalance the frictional forces acting in opposition to pendulum movements.

A means for controlling the periods during which the windings W are energized is obtained by connecting the contact springs 23 and 24 (which effectively form a back contact) in series with the windings W. The contact springs 23 and 24 are in contact during portions of each cycle, the periods of contact being determined by the motion of the roller bearing 36 which actuates the contact spring 23. A description of the motion of the roller bearing 36 in relation to pendulum motion is essential at this time.

Figure 4:
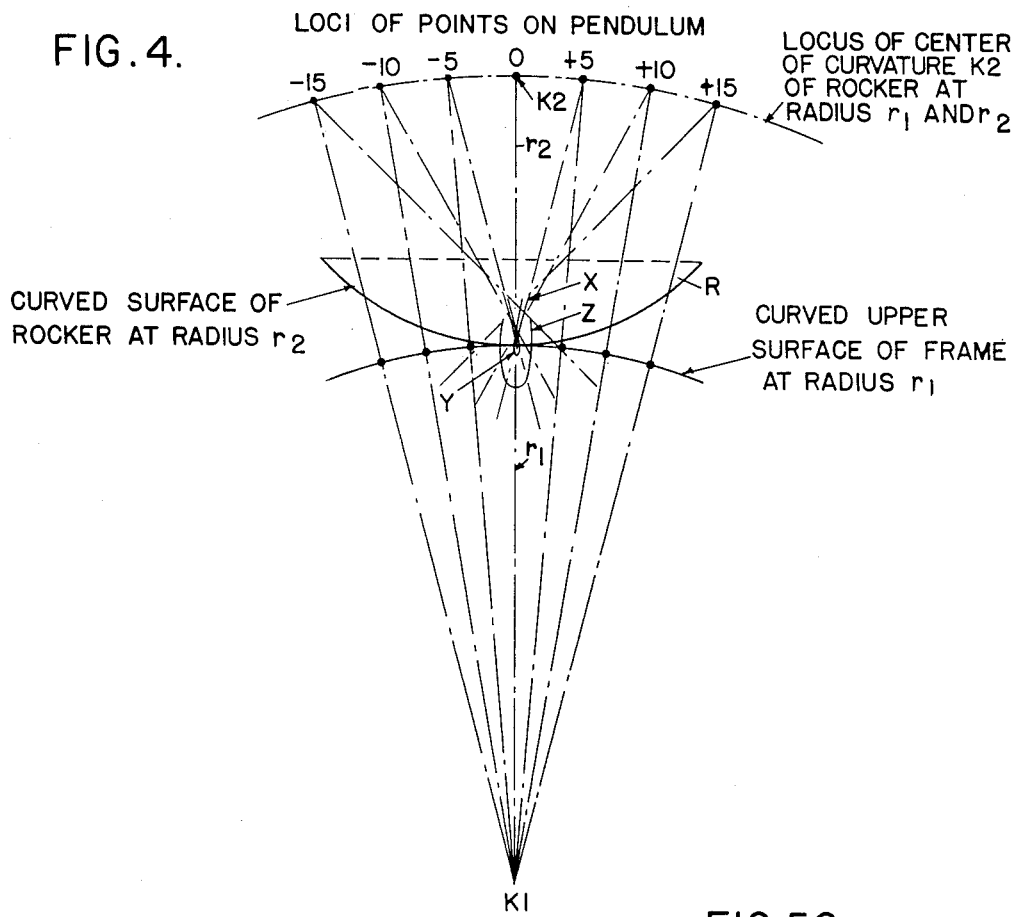
Fig. 4 shows diagrammatically the loci of various points on the pendulum embodied in this invention during periods of rotational displacement.

Referring now to Fig. 4, the curved surfaces of the rocker R and the frame F are shown in cross section schematically, the rocker R being represented in its normal (pendulum vertical) position at the apex of the curved upper surface of the frame F. Points K1 and K2 represent the centers of curvature of the rocker R and frame F surfaces, respectively; and the reference characters $r_1$ and $r_2$ designate the corresponding radii of curvature. It is evident that when the rocker R rolls along the surface of the frame F in either direction the center of curvature K2 describes an arc having a radius equal to the sum of the radii $r_1$ and $r_2$ and having a center of curvature lying at the point K1.

A series of points on the surface of the frame F demarks five degree lengths of arc along the surface. Lines drawn from the center of curvature K1 through the points on the surface of the frame F are extended to intersect the locus of the center of curvature K2; and each point of intersection locates the position of the center of curvature K2 when the rocker is tangent to the surface of the frame F at the corresponding point on the surface of the frame F. The position of the pendulum P at each position of the center of curvature K2 is shown. The pendulum makes an angle with the radius $r_2$ equal to the ratio of $r_1$ to $r_2$ times the length of arc along the surface of the frame F from the normal rocker position to the displaced position.

In order to trace the path described by the horizontal axis of the roller bearing 36 (and 37), arbitrary locations of the axis are assigned. Curves X, Y and Z are loci of a point on the axis of the roller bearing when the axis lies on the vertical centerline of the pendulum. The curve X applies to an axial location along the line of tangency of the rocker surface and the frame surface, while the curves Y and Z apply to axial locations at increasing distances below the line of surface tangency.

Since the roller bearings 36 and 37 serve to actuate the contact springs 23 and 26 through a vertical distance equal to the spacing between the contact springs 23 and 22 or 26 and 25, the axis of the roller bearings should describe a nearly vertical path of the necessary magnitude to operate the contact springs. It is evident that the path described by the curve Y best approximates the desirable conditions of motion by the axis of the roller bearings 36 and 37; and the path of motion of the roller bearings 36 and 37 when located as shown in Figs. 1 and 2 is approximated by the curve Y.

It can be noted that since the roller bearings 36 and 37 are free to move about their common axis, the contact springs 23 and 26 maintain contact with the outer races of the bearings 36 and 37, respectively, along the same line of contact. Thus, the vertical motion described by the axis of the bearings is essentially the same as that described by the lines of contact between the bearings and the contact springs.

The physical dimensions of the oscillator illustrated in the accompanying drawings are such that the angular amplitude of oscillation of the pendulum P is approximately sixty degrees, the rocker R rolling across ten degrees of arc in each direction from the apex along the curved surface of the frame F.

Returning now to the description of a means for controlling the driving force applied to the pendulum P:

As the pendulum P swings toward the core C (the windings W being energized) the roller bearing 36 applies a vertical force against the contact spring 23 resulting in the opening of the back contact formed by the springs 23 and 24. The energizing circuit for the windings W opens resulting in the collapse of the magnetic field. The pendulum P, however, continues to swing toward the core C until its momentum is overcome by the forces of gravity, friction and the springs S1, S2 and S3. As the pendulum reaches its point of maximum displacement, the roller bearing 36 moves vertically far enough to cause contact between the contact springs 23 and 22.

Figure 5A:
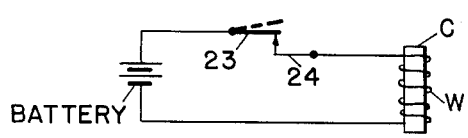
Figs. 5A–5C show diagrammatically circuit arrangements employing contacts of the oscillator to control input and output energies.

The pendulum now begins to oscillate at an amplitude equal to twice the distance of forced displacement and at a frequency determined by the physical properties of the structure. The roller bearing 36 also performs periodic motion causing the various contact springs to make and break twice during each cycle. Fig. 5A shows diagrammatically a circuit for periodically energizing the windings W in response to operations of the contact springs 23 and 24.

Since the contact springs 23 and 24 close the energizing circuit for the windings twice during each cycle it can be noted that during one closure the pendulum is swinging toward the core C while during the second closure the pendulum is swinging away from the core C. In the latter case, the air gaps A are increasing as the magnetic field is building up; thus the magnetic force exerted on the pendulum is essentially negligible.

Thus, the mechanical and electromagnetic elements of the oscillator are adjusted so that the driving force exerted on the pendulum P by the magnetic field of the windings W is of the same order of magnitude as the forces acting to damp free oscillations of the pendulum. An essentially constant frequency of oscillation is obtained which approaches very nearly the natural frequency of oscillation of the pendulum.

Minor adjustments of the path of travel of the roller bearings 36 and 37 are made by inserting or removing quantities of the previously described shims 3; and such adjustments have virtually no effect on the period of oscillation of the pendulum.

The preceding description of the actuation of the contact spring 23 by the roller bearing 36 also applies to actuations of the contact spring 26 by the roller bearing 37.

In order to effectively change the frequency of oscillation of the pendulum to a higher or lower value, the magnitudes of the removable weights M must be changed. The two weights M are always equal in weight to maintain mechanical equilibrium in the oscillator.

Figure 5C:
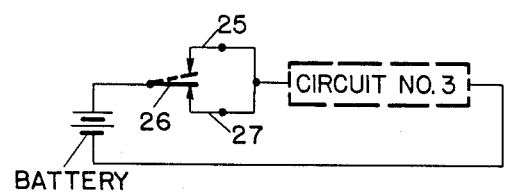

The back contacts formed by the contact springs 23 and 24, 26 and 27 are opened and closed twice during each cycle of pendulum oscillation; and the front contacts formed by contact springs 23 and 22, 26 and 25, also open and close twice per pendulum cycle. A use for the back contacts 23—24 in the energizing circuit for the windings W having been described, uses of the contact springs 25, 26 and 27 in external circuits are illustrated in Figs. 5B and 5C.

Figure 5B:
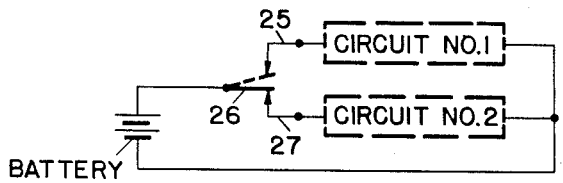

In Fig. 5B, circuit #1 is energized whenever the front contacts 25—26 are closed, circuit #2 being energized whenever back contacts 26—27 are closed. The energy received by circuits #1 and #2 are received in pulses at a rate equal to twice the rate of pendulum oscillation; and the energies received by the two circuits are out of phase.

The oscillator structure can be arranged so that the various front contacts are closed for periods as long as the closed periods of the back contacts. Thus, energy supplied to circuit #3 (see Fig. 5C) is received in pulses at a rate equal to four times the rate of oscillation of the pendulum. The contact springs 25 and 27 are assumed to be electrically connected externally when used as shown in Fig. 5C.

Having described an electromechanical oscillator as one specific embodiment of the present invention, it is desired to be understood that this form is selected to facilitate in the disclosure of the invention rather than to limit the number of forms which it may assume; and, it is to be further understood that various modifications, adaptations and alterations may be applied to meet the requirements of practice, without in any manner departing from the spirit or scope of the present invention.

What I claim is:

1. In an electromechanical oscillator, a frame member having a cylindrically convex upper surface, a rocker member mounted above said frame member and having a cylindrically convex lower surface arranged to cooperate with said upper surface of said frame member to permit said rocker member to rock back and forth, a pendulum rigidly suspended from said rocker member and having its center of gravity substantially below said upper surface of said frame member, and an electromagnet arranged to co-act, when energized, with said pendulum.

2. In an electromechanical oscillator, a frame member having a cylindrically convex upper surface, a rocker member located above said frame member and supported by it on a cylindrically convex lower surface to permit said rocker member to roll back and forth on the smooth upper surface of said frame member, means for holding said rocker member in position above said frame member in a manner permitting said rocker member to roll back and forth in the same path, a pendulum rigidly suspended from said rocker member with the main portion of its mass located substantially below said co-acting surfaces of said rocker member and said frame member to provide for an inherent periodicity of swinging motion, and an electromagnet effective when energized to act on said pendulum.

3. In an electromechanical oscillator, a frame member having a smooth upper surface, a rocker member having an arcuate lower surface located above and cooperating with said upper surface of said frame member to permit said rocker member to rock back and forth, a pendulum suspended from said rocker member for a substantial distance below said cooperating surfaces, a plurality of movable contact fingers cooperating with a plurality of fixed contacts, all of said contacts being securely suspended along with said frame member, a contact operator connected to said pendulum at a point slightly below a line of tangency with said cooperating surfaces of said rocker and frame members, said contact operator acting on said movable contact fingers to give them a reciprocating motion as said pendulum swings back and forth, and an electromagnet having its energy controlled by certain of said contacts and magnetically acting on said pendulum during limited portions of its path of motion.

4. In an electromechanical oscillator, a frame member having a convexly curved upper surface, a rocker member having a convexly curved rolling surface, said rocker member being located above and supported by said frame member in a manner such that said convexly curved surfaces of said rocker and said frame cooperate to permit rolling motion by said rocker, resilient means for holding said rocker in position on said convexly curved surface of said frame, said resilient means permitting said rocker to perform rolling motion only, a pendulum suspended from said rocker, said pendulum extending downward a substantial distance below said rocker so that the center of gravity of said pendulum lies below said convexly curved surfaces of said rocker and said frame, and electromagnetic means for periodically exerting a magnetic force on said pendulum.

5. In an electromechanical oscillator, a frame member having a cylindrically convex upper surface, a rocker member having a cylindrically convex rolling surface, spring means for positioning and holding said rocker member above said frame member in a manner such that said rocker member is capable of performing only rolling motion along a path concentric with said cylindrical surface of said frame member, a pendulum supported by said rocker member, said pendulum extending downward and having its center of gravity located below the cylindrical surfaces of said rocker and frame members, means for shifting the center of gravity of said pendulum for altering the period of oscillation of said pendulum, a plurality of fixed and movable contact springs, a contact operator attached to said pendulum, said contact operator imparting a reciprocating motion to said movable contact springs as said pendulum oscillates, an electromagnet for applying a magnetic force on said pendulum, and circuit means including a number of said contact springs for periodically energizing said electromagnet.

6. In an electromechanical oscillator, a frame member having a cylindrically convex upper surface, a rocker member having a cylindrically convex rolling surface, a plurality of leaf springs attached to said rocker member and to said frame member, said leaf springs holding said rocker member in a position above said frame member such that said rocker member is capable of performing only rolling motion along a path concentric with the cylindrically convex surface of said frame member, means for adjusting said leaf springs to position said rocker member, a pendulum suspended from said rocker member, said pendulum extending downward an having its center of gravity located at a point a substantial distance below said cylindrically convex surfaces of said rocker and frame members, an electromagnet capable, when energized, of exerting a magnetic force on said pendulum; and circuit means for periodically energizing said electromagnetic means during predetermined ranges of pendulum positions.

7. An electromechanical oscillator comprising, a U-shaped pendulum made of a magnetic material, a rocker attached to said pendulum between the arms of said pendulum, a frame for supporting said rocker, means for attaching said rocker to said frame in a manner such that said rocker is capable of performing rolling motion only, electromagnetic means capable of applying a magnetic force to said pendulum, and circuit means dependent upon positions of said pendulum for operating said electromagnetic means, said circuit means causing said electromagnetic means to apply a magnetic force to said pendulum during predetermined ranges of pendulum positions.

8. An electromechanical oscillator comprising, a U-shaped pendulum made of a magnetic material, a rocker attached to said pendulum between the arms of said pendulum, a frame for supporting said rocker, means for attaching said rocker to said frame in a manner such that said rocker is capable of performing rolling motion only, electromagnetic means for applying a magnetic force on said pendulum, contact springs, a roller bearing attached to each arm of said pendulum, said roller bearing actuating said contact springs in response to movements of said pendulum, and circuit means including said contact springs for operating said electromagnetic means.

9. An electromechanical oscillator comprising, a U-shaped pendulum made of a magnetic material, means for supporting said pendulum in a manner such that the arms of said pendulum extend downward and rotate in parallel vertical planes, contact springs, a roller bearing attached to each arm of said pendulum, the axis of each of said roller bearings being perpendicular to the planes of rotation of arms of said pendulum, said roller bearings actuating said contact springs in accordance with motions of said pendulum, electromagnetic means for applying a magnetic force to said pendulum, and circuit means including said contact springs for controlling said electromagnetic means.

10. An electromechanical oscillator comprising, a U-shaped pendulum, a rocker, said rocker being attached to said pendulum between the arms of said pendulum, a frame for supporting said rocker, a plurality of leaf springs for attaching said rocker to said frame, said springs passing between said rocker and the supporting surface of said frame, said springs being aligned in a manner to allow only rolling motion by said roller; and means for attaching said springs to said roller and said frame, said means being capable of adjusting tensions in said springs.

11. An electromechanical oscillator comprising, a U-shaped pendulum secured to a rocker, a detachable weight secured to each arm of said pendulum, the magnitudes of said weights functioning to control the period of oscillation of said pendulum, a frame for supporting said rocker, a plurality of leaf springs for attaching said rocker to said frame, said springs passing between said rocker and the supporting surface of said frame, said springs being aligned in a manner to allow only rolling motion by said roller; and means for attaching said springs to said roller and said frame, said means being capable of adjusting tensions in said springs.

12. In an electromechanical oscillator, a frame, the upper surface of said frame being curved convexly, a rocker, a plurality of leaf springs having rectangular cross-sections, said springs being attached to said roller and said frame in a manner such that said springs pass between said rocker and said frame, means for positioning and tensionally adjusting said springs so that said rocker is seated at the apex of the curved upper surface of said frame and is allowed to perform only rolling motion along a path concentric with the curved upper surface of said frame, and a U-shaped pendulum seated on and fastened to said rocker in a manner such that the arms of said pendulum project downward and are equidistant from and parallel to the vertical plane of rotation of said rocker containing the center line of said rocker.

13. An electromechanical oscillator comprising, a frame having a convexly curved upper surface, a rocker, spring means for positionally attaching said rocker to said frame, said spring means normally positioning said rocker at the apex of the curved upper surface of said frame and permitting said rocker to perform only rolling motion along a path concentric with the curved upper surface of said frame, a U-shaped pendulum made of a magnetic material, said pendulum being seated on said rocker in a manner such that the arms of said pendulum extend downward, means for attaching said pendulum to said rocker, said means allowing adjustment of the length of said pendulum arms extending below said rocker, a detachable weight fastened to each arm of said pendulum, the magnitudes of said weights controlling the period of oscillation of said pendulum, an electromagnet attached to said frame, said electromagnet being located centrally between the motional paths described by the arms of said pendulum and being capable, when energized, of exerting a displacing magnetic force on said pendulum, a roller bearing attached to each arm of said pendulum, a plurality of contact springs, said contact springs being actuated by said roller bearings during periods of pendulum movement, the frequency of actuation of said contact springs being a multiple of the frequency of oscillation of said pendulum; and circuit means including a plurality of said contact springs for periodically energizing said electromagnet.

14. In an electromechanical oscillator, a frame having a cylindrically convex upper surface, a rocker having a cylindrically convex rolling surface, three leaf springs attached to said rocker and said frame, said springs passing between said rocker and said frame, means for adjusting said leaf springs so that said rocker is seated in a manner such that the axes and apices of the cylindrical surfaces of said frame and said rocker lie in a common vertical plane, said springs permitting said rocker to perform only rolling motion along a path concentric with the cylindrical surface of said frame, said springs exerting a restoring force on said pendulum; and a U-shaped pendulum seated on said rocker, the arms of said pendulum projecting downward and describing motional paths parallel to and equidistant from the central vertical plane of rotation of said rocker.

References Cited in the file of this patent

UNITED STATES PATENTS

| 1,469,231 | Marbury | Oct. 2, 1923 |
| 2,587,452 | Farris | Feb. 26, 1952 |

FOREIGN PATENTS

| 192,871 | Germany | Dec. 12, 1907 |